F. X. MUDD.
SHOCK ABSORBER.
APPLICATION FILED DEC. 18, 1915.
1,241,468.
Patented Sept. 25, 1917.
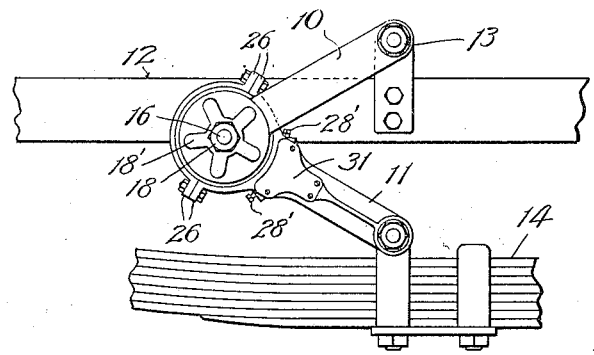
Fig. 1.
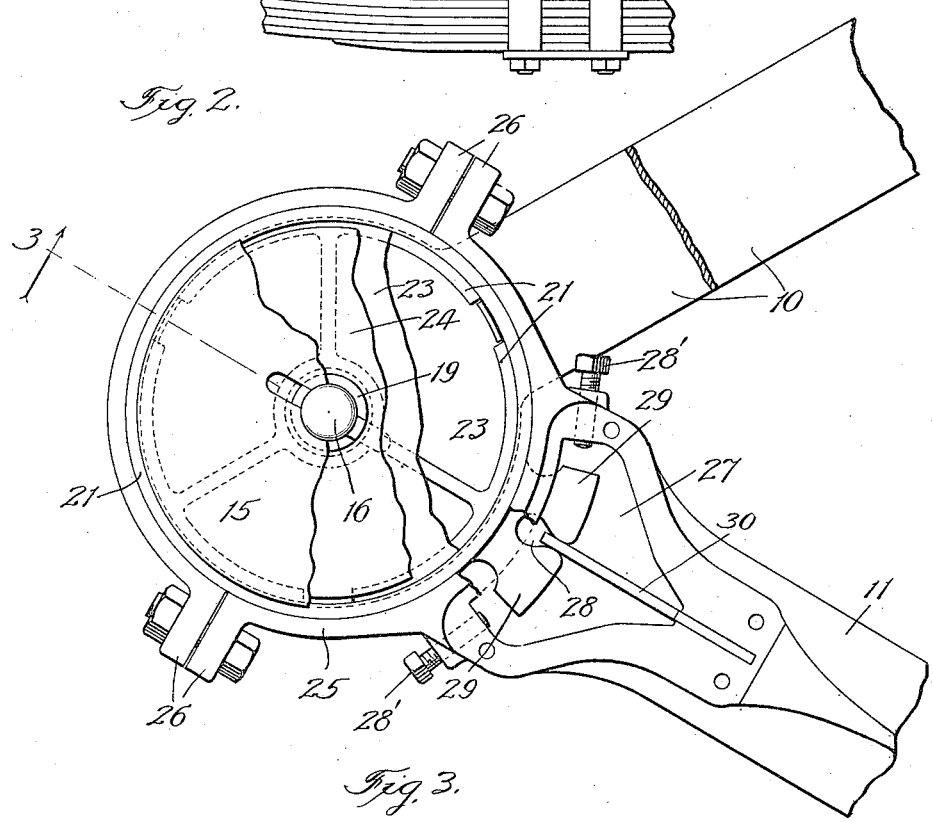
Fig. 3.
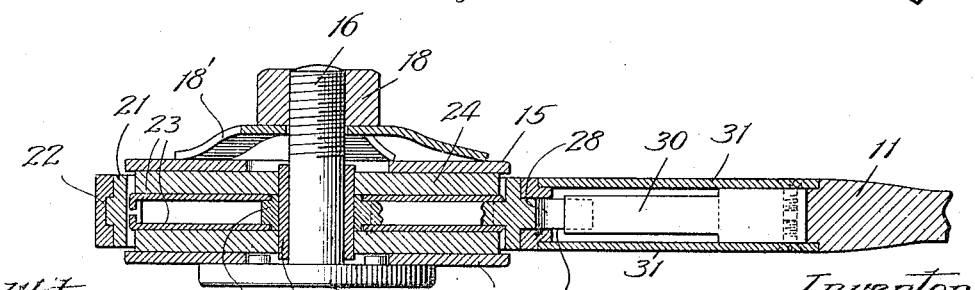
Witnesses:
Inventor:
Frank X. Mudd,
By Dyrenforth, Lee, Chritton and Wiles
Att'ys.

UNITED STATES PATENT OFFICE.

FRANK X. MUDD, OF CHICAGO, ILLINOIS.

SHOCK-ABSORBER.

1,241,468.   Specification of Letters Patent.   Patented Sept. 25, 1917.

Application filed December 18, 1915. Serial No. 67,581.

*To all whom it may concern:*

Be it known that I, FRANK X. MUDD, a citizen of the United States, residing at Chicago, in the county of Cook and State of Illinois, have invented a new and useful Improvement in Shock-Absorbers, of which the following is a specification.

My invention relates to improvements in shock-absorbers, and particularly to the elbow type of absorber provided with a friction pivot-joint. The object of the invention is to provide an absorber of this type in which the angularly-disposed arms may have a certain limited movement with relation to one another free of the retarding force of the friction pivot, this force being brought into action gradually as the angular movement of the arms progressively increases.

The invention will be more fully understood from the following detailed specification, taken in connection with the accompanying drawings:

In these drawings, Figure 1 is a side elevation of a shock absorber constructed in accordance with my invention, showing the manner of application of the device to a vehicle frame and spring; Fig. 2 is an enlarged side elevation of the operative portion of the structure, one face of the device being removed, and Fig. 3 is a transverse section through the complete structure, taken on the line 3 of Fig. 2.

In general the shock absorber which comprises the subject matter of my present improvement, comprises a pair of angularly-disposed arms 10 and 11, provided with a friction pivot-joint generally designated by the numeral 12, one arm being designed to be secured one to the chassis frame of a vehicle as shown at 13, and the other to the spring or axle thereof, as shown at 14 in Fig. 1. As commonly constructed one of the arms, for instance the arm 10, is bifurcated at its inner end and has formed integrally thereon friction disks 15 suitably apertured to receive a pivot-bolt 16 provided with an enlarged head 17 on one end which may be locked against rotation with respect to the corresponding disk 15, as by lugs engaging slots in the latter, and carrying a tensioning nut 18 on its outer end which is adapted to compress a spring tensioning spider $18^1$ which bears against the outer face of the second friction disk. A bushing 19 surrounding the bolt 16 and locked to the disk 15, as by lugs entering the slots of the latter, serves as a journal for a central wheel 20 of slightly greater diameter than the disk 15 and having a rim 21 provided on its outer surface with a rib 22. The friction surfaces of the wheel 20 are preferably formed as separate disks 23 locked to the rim of the wheel, as by inturned lugs shown in Fig. 3. Between the outer faces of the disks 23 and the inner faces of the arm disks 15 are placed friction members 24 which may be of wood or any other desired substance. For connecting the arm 11 with the central wheel 20 the inner end of the former is provided with a split ring 25, the halves of which are bolted together as by the ears 26. Adjacent its connection with the ends 25 the arm 11 has a cavity 27 therein. An arcuate slot 28 in the inner end of the arm 11 communicates with the cavity 27 and through this slot pass arms 29 formed upon or secured to the rim of the central wheel 20. By this construction the central wheel 20 may have a limited angular movement with relation to the arm 11, the movement being positively limted by the arms 29 and slot 28. For further limiting and adjusting this movement a pair of set-screws $28^1$ are tapped into the arm 11, in position to engage the arms 29. A leaf spring 30 has its outer end caught in a suitable aperture in the arm 11 and its inner end lying between and engaging the opposed faces of the wheel arms 29. Cover plates 31 secured in any suitable manner to the faces of the arm 11 house the spring 30, and prevent foreign matter from entering the interior. In the operation of my device the shock-absorber will be attached between the chassis frame and the spring or axle of a vehicle in the manner shown by Fig. 1, and the nut 18 will be tightened to cause the spring spider $18^1$ to exert a considerable force of compression binding the outer disks 15 carried by the arm 10 against the friction disks 24 and the latter against the surfaces of the central wheel 20. By this construction there is formed a pivot-joint having a considerable frictional resistance. The arm 11 with its split ends 25 freely pivots about the periphery of the central wheel 21, however, having no frictional resistance, and for the initial angular movement of the arms 10 and 11, therefore, the only resisting force is that of the leaf spring 30. The force exerted by this spring will, of course, be proportional to its deflection, gradually increasing until the force exerted by the spring is equal to the friction lock of the pivot joint proper. Further angular movements of the arm 11 with reference to the arm 10 will thereupon cause the central wheel 20 to move as a unit with the arm 11, under the frictional resistance above described.

While I have shown and described in considerable detail one specific embodiment of my invention, it is to be understood that this showing and description is illustrative only, and for the purpose of making my invention more clear, and that I do not regard the invention as limited to these details, nor to any of them, except in so far as I have included such limitations within the terms of the following claim, in which it is my intention to claim all novelty inherent in my invention, in so far as is permissible in view of the prior art.

What I claim as new and desire to secure by Letters Patent is:—

A shock-absorber comprising a friction pivot member, an arm oscillatable thereabout and having an arcuate slot in the plane of the said member, spaced excrescences on the said member working in the said slot, a radial leaf spring secured at its outer end to the said arm and having its inner end extending between the opposed faces of the said excrescences, means for pivotally attaching the outer end of said arm to a vehicle, a second friction pivot member concentrically arranged with reference to said first member, means for forcing the friction surfaces of said members into engagement, an arm mounted upon said second friction pivot member, and means for pivotally attaching the outer end of said arm to a relatively movable part of the said vehicle.

FRANK X. MUDD.

In presence of—
O. C. AVISUS,
D. C. THORSEN.

Copies of this patent may be obtained for five cents each, by addressing the "Commissioner of Patents, Washington, D. C."